United States Patent
Kulkarni et al.

(10) Patent No.: US 12,159,042 B2
(45) Date of Patent: Dec. 3, 2024

(54) MANAGING MEMORY OF A SECURE ELEMENT DOMAIN, ELECTRONIC DEVICE AND METHOD

(71) Applicant: NXP B.V., Eindhoven (NL)

(72) Inventors: Giten Kulkarni, Bangalore (IN); Andreas Lessiak, Graz (AT)

(73) Assignee: NXP B.V., Eindhoven (NL)

( * ) Notice: Subject to any disclaimer, the term of this patent is extended or adjusted under 35 U.S.C. 154(b) by 32 days.

(21) Appl. No.: 18/184,809

(22) Filed: Mar. 16, 2023

(65) Prior Publication Data
US 2023/0325096 A1    Oct. 12, 2023

(30) Foreign Application Priority Data
Apr. 8, 2022 (EP) .................................. 22167435

(51) Int. Cl.
*G06F 3/06* (2006.01)
(52) U.S. Cl.
CPC ............ *G06F 3/062* (2013.01); *G06F 3/0662* (2013.01); *G06F 3/0679* (2013.01)
(58) Field of Classification Search
CPC ....... G06F 3/0679; G06F 3/0662; G06F 3/062
See application file for complete search history.

(56) References Cited

U.S. PATENT DOCUMENTS

| | | | |
|---|---|---|---|
| 9,049,046 B2 | 6/2015 | Andreasen et al. | |
| 9,654,556 B2 | 5/2017 | Chan et al. | |
| 10,387,054 B2 | 8/2019 | Del Giudice et al. | |
| 2006/0259735 A1* | 11/2006 | Anand | G06F 12/1027 711/205 |
| 2020/0242274 A1* | 7/2020 | Pan | G07G 1/14 |

FOREIGN PATENT DOCUMENTS

| | | |
|---|---|---|
| EP | 2778841 A2 | 9/2014 |
| EP | 3242243 B1 | 7/2019 |
| EP | 3798888 A1 | 3/2021 |

OTHER PUBLICATIONS

Fleishman, Glenn; Senior Contributor, Macworld; "What are offloaded apps in iOS 11 and how do they work?"; MAC 911, Nov. 15, 2017; https://www.macworld.com/article/230694/what-are-offloaded-apps-in-ios-11-and-how-do-they-work.html.
GlobalPlatform, Inc., The Standard for Secure Digital Services and Devices; "GlobalPlatform Technology VPP—Concepts and Interfaces, Version 1.0.1" Public Release Aug. 2018; Document Reference GPC_FST_142.

* cited by examiner

*Primary Examiner* — Edward J Dudek, Jr.

(57) ABSTRACT

It is described an electronic device, comprising a secure element domain that further comprises:
i) a physical memory region configured to store a plurality of data sets; and
ii) a control device, coupled to the physical memory region, and configured to transfer at least one data set away from the physical memory region, wherein transferring the data set comprises at least one of:
a) transferring the data set as a first data blob to a virtual memory region of the secure element domain;
b) off-loading the data set as a second data blob to an external domain.

17 Claims, 5 Drawing Sheets

MANAGING MEMORY OF A SECURE ELEMENT DOMAIN, ELECTRONIC DEVICE AND METHOD

CROSS-REFERENCE TO RELATED APPLICATIONS

This application claims priority under 35 U.S.C. § 119 to European Patent Application No. 22167435.1, filed on Apr. 8, 2022, the contents of which are incorporated by reference herein.

FIELD OF THE DISCLOSURE

The disclosure relates to an electronic device with a secure element domain that comprises a physical memory region and in particular a virtual memory region. Further, the disclosure relates to a method of managing such a secure element domain, in particular regarding memory organization. Thus, the disclosure may relate to the technical field of memory management in the context of an electronic device that comprises a secure element, a SIM or an embedded SIM (e.g. a smart card or an eUICC within a (mobile) device).

BACKGROUND OF THE DISCLOSURE

Electronic devices, in particular mobile electronic devices such as smart cards or mobile phones, can comprise a secure element (SE) that functions as a specific storage unit that stores sensitive data such as user credentials which are mandatory to perform specific transactions and/or secure element applications.

A secure element system can be connected to a host domain of the (mobile) electronic device, for example, in a mobile NFC-SE system, the secure element is installed with multiple applications (Java card applets for payment, transit, access etc). Further, a SE can also have an embedded SIM implementation, which supports installing of multiple telecom operator profiles. All these initial or later-run time applications that are installed use up non-volatile memory (NVM) space (physical memory region) of the secure element. Not all such applications that are installed are activated by user or, if activated, are only used with large time intervals in between. This circumstance may lead to inefficient utilization of the available NVM, so that there is a high demand of customers towards a continuous increase of the physical memory region.

However, increasing the physical memory region of the SE would result in a major die size and hence cost impact, while the industry trend is actually towards miniaturization. Further, the memory may fall short because more/newer applications get added to the mobile (NFC-) SE. In this context, it should be noticed that SE applications are installed in a specific security hierarchy on the SE and known methods of memory utilization need to go through a secure processing requiring access to multiple security domains, access privileges, and credentials.

SUMMARY OF THE DISCLOSURE

There may be a need to manage the memory of a secure element in an efficient and reliable manner. An electronic device and a method are provided.

According to an aspect of the disclosure, there is a described an electronic device (e.g. a smart card or a mobile phone) that comprises a secure element domain that further comprises:

i) a physical memory region (in particular a non-volatile memory, more in particular an active memory region) configured to store a plurality of data sets (e.g. secure elements applications, (eUICC) profiles);
(in particular further comprising a virtual memory region (in particular a compressed (inactive) memory region) coupled to the physical memory region); and
ii) a control device (in other words a control/management device), coupled (e.g. electrically connected) to the physical memory region (and the virtual memory region), and configured to transfer at least one data set of the plurality of data sets away from (out of) the physical memory region (thereby releasing the physical memory region).

Hereby, transferring the data set comprises:
a) transferring the data set as a first data blob (in particular a compressed data blob) to a (the) virtual memory region of the secure element domain (transfer at least one data set away from active memory region to a compressed memory region); and/or
b) off-loading the data set as a second data blob (in particular a secure data blob) to an exterior domain (in particular a host domain, of the electronic device).

According to a further aspect of the disclosure, there is a described a method of managing a secure element domain that comprises a physical memory region with a plurality of data sets, the method comprising:
i) analyzing the data sets stored in the physical memory region with respect to a data transfer criterium, and, in case that the data transfer criterion is fulfilled for a data set of the plurality of data sets:
ii) transferring said data set away from the physical memory region.

Hereby transferring the data set comprises:
a) transferring the data set as a first data blob to a virtual/compressed memory region of the secure element domain; and/or
b) off-loading the data set as a second data blob to an exterior domain, in particular a host domain.

According to another aspect of the disclosure, a mobile device is provided that comprises the electronic device described above. Hereby, the mobile device may be configured as a smart card or a mobile phone.

According to another exemplary embodiment, a computer program product (in particular a non-transitory computer program product) is provided, which is configured to (for example, by comprising specific instructions), when being executed on a control device (or a computer), cause the control device (or computer) to perform the method as described above.

In the context of the present document, the term "electronic device" may refer to any device that can comprise a secure element. An electronic device may be for example a smart card or a mobile phone. The electronic device may further comprise a (plurality of) circuit(s), an integrated circuit, a host domain, an application domain, an application control device, an NFC domain, etc.

In the context of the present document, the term "secure element domain" may refer to a domain of an electronic device that comprises or consists of at least one of a secure element, a SIM, an embedded SIM, a UICC, an embedded UICC. A "secure element" may be a specific storage unit that stores sensitive data such as user credentials which are mandatory to perform specific transactions. For example, if the secure element is built in a smart-phone, the operating system and other applications of the smart phone may not enter the data stored on the secure element. Hereby, the secure element may only be accessed by specific and authorized transactions (e.g. by an external reader device of a point of sale). The secure element may comprise one or more, in particular two or more, interfaces for different applications. The secure element domain may comprise only the secure element or the secure element domain may comprise the secure element and further units. For example, the secure element may comprise a secure element operating system or the secure element domain may comprise the secure element and additionally a secure element operating system (e.g. on a further circuit/control device). The secure element domain may comprise one or more secure elements. The secure element may be an embedded secure element or a removable secure element. The secure element domain may comprise a "UICC" (or embedded UICC) and/or a SIM in addition or instead of the secure element. The secure element domain may further comprise an interface to a contact-less communication domain (e.g. NFC) and/or an interface to an application control device, in particular to a host domain. Furthermore, the secure element domain may comprise a physical memory region, a virtual (logical) memory, and a control device that is coupled to the memories.

In the context of the present document, the term "physical memory" may refer to an electronic component that is suitable for storing a data set. In particular, a physical memory links directly to physical memory bits. Preferably, the physical memory is configured as a non-volatile memory (NVM). A "physical memory region" may be a part of the physical memory configured to store active (uncompressed) data sets. The physical memory region may also be termed an "active memory region". The term "virtual memory" may in particular refer to a memory space that is organized in a different manner as the physical memory (region) and that is generally larger than the physical memory. A "virtual memory region" may be a part of the virtual memory configured to store (temporarily) inactive (and preferably compressed) data sets. The virtual memory region may also be termed "compressed memory region".

In the context of the present document, the term "control device" may in particular refer to a control unit that is configured to organize the described steps of transferring the data set. In an example, the control device is configured as one or more processors. In a further example, the control device can be a hardware and/or a software. For example, the control device may be (at least partially) the card operating system (OS). While in an example, the control device is part of the secure element domain, the control device may be in another example (at least partially) located remote of the secure element domain.

In the context of the present document, the term "data blob" may in particular refer to a collection of binary data stored as a single entity. A blob (or large binary object) may for example encode (part of) an application (executable code) or a multimedia object (e.g. image or audio). In an example, a data blob may correspond to a specific data set and may be additionally compressed and/or secured, e.g. encrypted. A data blob may be spitted into one or more parts, each being smaller than the original data blob. The term "large" may be relative in this context. While a data blob may comprise a size of kilobytes or megabytes (or more), a data blob may also comprise a size of e.g. 256 bytes or smaller.

According to an exemplary embodiment, the memory of a secure element may be managed in an efficient and reliable manner, when specific data sets to be transferred (fulfill a transfer criterion) are transferred from the physical memory region as a respective data blob to be stored either in an external domain (off-loading) or (in compressed form) in the compressed memory region (transferring). Free physical memory region can thus be obtained by removing the specific data sets, in particular secure element applications, that are not frequently used or are otherwise not considered important (i.e. fulfill the transfer criterion), away from the physical memory region. In other words, the physical memory region (SE NVM) is most efficiently used by securely transferring away the less frequently used data sets, without impacting the security hierarchy (of the secure element domain) and hence not requiring access to security domains/keys and to re-run secure installation procedures when reloading/de-compressing such data sets (objects). Further, the described approach may be implemented in existing systems in a cost-efficient and straight-forward manner.

DETAILED DESCRIPTION OF EXEMPLARY EMBODIMENTS

In the following, further exemplary embodiments of the method, the electronic device, and the communication system will be explained.

According to an embodiment, the control device comprises an object manager, wherein the object manager is configured to register (and/or store) the position of the first data blob in the virtual memory region and/or the position of the second data blob in the exterior domain. Thereby, the transfer (and re-transfer) of the data sets may be organized in an efficient and secure manner. The object manager may be up-dated on a regular basis to keep track on the data blobs, so that each data set can be located. In an example, meta data and/or link data are applied by the object manager with respect to the data set. In an example, the OS manages a table (object manager) with meta data to manage available memory to guarantee restoring of data is possible.

According to a further embodiment, the control device is configured to analyze (at least a part of) the data sets stored in the physical memory region with respect to a data transfer criterium, and, in case that the data transfer criterion is fulfilled for a data set of the plurality of data sets: perform the transfer of the data set. In this manner, data sets to be transferred may be efficiently selected. An example of the data transfer criterium may include the number of uses of the data set. Thus, if a data set is not applied frequently, it may be transferred to the compressed memory region or the external domain. According to a further embodiment, analyzing comprises periodically checking for free physical memory region space. According to an example, the conditions (criterium) for compressing a data set (e.g. a eUICC profile) may comprise e.g.: initial compression—profile not used during phone production, run time more than 'n' profiles installed (e.g. >3), profile not used. In an example, the control device may be configured as a module (at least partially) in the secure element.

According to a further embodiment, a security hierarchy of the security domain is (essentially) independent of at least one of the transferring and the off-loading (in other words, the security hierarchy is (essentially) not affected by the transfer/off-load). Thus, the efficient usage of the physical memory region may be performed in a straightforward manner, without interacting with the security hierarchy. Thus, no encryption keys etc. may be necessary.

According to a further exemplary embodiment, off-loading or compression is applied to improve memory utilization on object's physical memory region while keeping the object's virtual memory region structure untouched. The objects hence maintain their installed status, and maintain secure access privileges within their installed security hierarchy. This may avoid the need for re-establishing the security hierarchy when restoring the content and can be done transparently by the card OS (control device). The card OS does not need to use secure card content management procedures which required secure credentials/privileges etc.

According to a further embodiment, the data set comprises at least one of a secure element application, a profile, in particular an eUICC profile, and a plurality of pages. Thus, common data sets of the secure element may be organized in a flexible manner.

According to a further embodiment, wherein transferring the first data blob to the virtual memory region comprises: compressing the data set to obtain a compressed data blob and transferring the compressed data blob to the virtual memory region (i.e. the compressed memory region). In a similar manner, the compressed first data blob may be de-compressed, when being re-transferred to the physical memory region (the uncompressed memory region). Compression may involve collecting all mapped pages of the application and creating a compressed blob (optionally encrypting, signing/hashing).

According to a further embodiment, the control device is further configured to: de-compress the compressed first data blob in parts being smaller than the first data blob (in other words: only a part of the compressed first data blob is de-compressed). Thereby, only part of the first data blob (in particular the necessary part) is de-compressed, while a further (not necessary) part remains compressed. In other words, re-load/de-compression may also take place regarding smaller chucks than the blob, adjusted to the NV page size to allow in-place compression/de-compression.

According to a further embodiment, the control device is further configured to allocate the physical memory region against required virtual memory region for the first data blob. Thereby, memory space of physical memory region and virtual memory region may be compared, to enable a secure and robust transfer/re-transfer.

According to a further embodiment, the control device is further configured to reload the off-loaded second data blob from the external domain. Off-loading and re-loading may be done through the same channel/interface or through different channels/interfaces. For example, one direction may be realized via a direct secure element domain to external domain interface, while the other direction may be realized via a further domain, e.g. a contact-less communication domain. In an example, secure off-loading may involve collecting all mapped pages of the application and creating a secure data blob by encrypting, signing/hashing as required and storing such secure blob in a memory outside the SE (off-card).

According to a further embodiment, reloading is (via an external-secure domain interface and) free of an additional secure channel. In an example, the second data blob is provided as a secure second data blob (e.g. by encryption, signing/hashing, etc.) so that the data blob is self-secure and further security means such as a security channel may be obsolete.

According to a further embodiment, the electronic device further comprises the external domain, configured to store the transferred second data blob in a further physical memory region, in particular wherein the external domain comprises at least one of a host domain and an application control device. Thus, a host domain of the electronic device may be directly applied as the external domain.

According to a further embodiment, the electronic device further comprises a contact-less communication domain coupled to the secure element domain via a domain interface. In the context of the present application, the term "contact-less communication domain" may refer to a domain of an electronic device (such as an integrated circuit) that is configured for performing, or taking part in, a contact-less communication transaction. Hence, the contact-less communication domain may comprise a contact-less communication control device and/or a contact-less communication controller. The term "contact-less" may mean a wireless communication such as for example via NFC, RFID, WLAN, or Bluetooth. For this purpose, a contact-less communication domain may comprise a controller circuit (or control device) in order to manage the contact-less communication (e.g. an NFC controller). Furthermore, the domain may comprise an interface to an antenna (e.g. an NFC antenna). In another example, the domain may comprise the interface and the antenna.

According to an exemplary embodiment, the contact-less communication domain is a near field communication (NFC) domain. This may provide the advantage that an efficient, robust and established technology (in particular an established standard) can be directly applied for performing a contact-less communication. In the context of the present application, the term "NFC" may refer to Near Field Communication which may be a short-range wireless technology (distances measured in centimeters) that is optimized for intuitive, easy, and secure communications between various devices without user configuration. In order to make two NFC devices communicate, users may bring them close together or even make them touch. The devices' NFC interfaces may automatically connect and configure themselves to form a peer-to-peer network. NFC may also bootstrap with other protocols, such as Bluetooth or Wireless Ethernet (WiFi), by exchanging configuration and session data. NFC may be compatible with contactless smart card platforms.

According to a further embodiment, the control device is further configured to at least one of
i) off-loading the (second) data blob from the secure element domain via the domain interface to the contact-less communication domain and via a communication-external interface to the external domain.
ii) reloading the (second) data blob from the external domain via the communication-external interface to the contact-less communication domain and via the domain interface to the secure element domain.

According to a further embodiment, the contact-less communication domain and the secure element domain are integrated into a common integrated circuit. In an embodiment, the contact-less communication domain and the secure element domain may be monolithically integrated.

According to another exemplary embodiment, the secure element domain comprises a secure element and a secure element domain operating system, wherein the secure element domain operating system has a scheduling algorithm.

The aspects defined above and further aspects are apparent from the examples of embodiment to be described hereinafter and are explained with reference to these examples of embodiment.

BRIEF DESCRIPTION OF THE DRAWINGS

The illustrations in the drawings are schematic. In different drawings, similar or identical elements are provided with the same reference signs.

DESCRIPTION OF EMBODIMENTS

Figure 1:
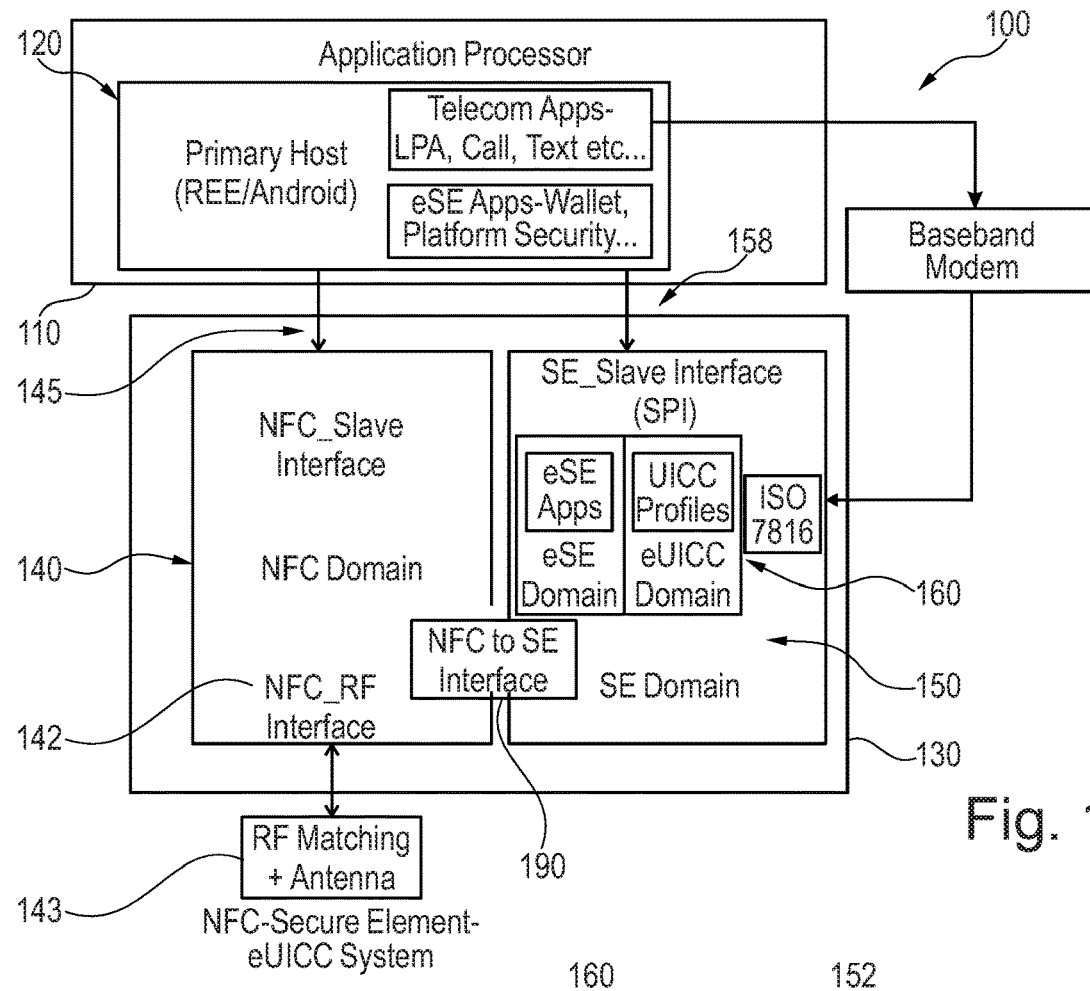
FIG. 1 illustrates an exemplary embodiment of an electronic device with a secure element domain according to an exemplary embodiment of the disclosure.

Before, referring to the drawings, exemplary embodiments will be described in further detail, some basic considerations will be summarized based on which exemplary embodiments of the disclosure have been developed.

According to an exemplary embodiment, there is described an efficient utilization of the SE NVM (physical memory region) by off-loading or compressing less frequently used SE application, without impacting the security hierarchy and hence not requiring access to security domains/keys and to re-run secure installation procedures. The SE logical (virtual) memory to physical memory region mapping (transfer) scheme can be extended with an object management function which manages the objects (data sets/blobs). Objects corresponding to individual (SE) applications could be 'available' (physically on card (SE domain)) or 'off-loaded' (off-card) or 'compressed' (compressed on-card) destinations (theoretically off-card compressed is also possible). Criteria (transfer criterium) can be defined for deciding to offload or compress applications, e.g. less frequently used applets can be securely offloaded or deactivated, while a mobile SIM profile can be compressed. An SE system or SE application fulfilling the defined criteria, is applied for secure offloading or compression on the physical pages of the mapped virtual NVM. The object management (object manager) map is then updated to indicate content present but 'off-loaded' or 'compressed' mapping (transfer). The physical memory region is then freed up for usage for other applications. Typically, the virtual memory region size is many multiples of physical memory region and this allows to retain the allocated virtual memory region structure even though the physical memory region is freed up. This allows to keep the complete installed security hierarchy to be untouched by off-loading or compressing procedure. On access to an application indicated as 'off-loaded' or 'compressed' in the object management mapping, the corresponding data blob is fetched/uncompressed back to the SE NVM and virtual mapping is restored to the (new) physical NVM mapping.

FIG. 1 illustrates an electronic device 100 according to an exemplary embodiment, e.g. a smart card, a PDA, or a smart phone. The electronic device 110 comprises an integrated circuit 130 which comprises a contact-less communication domain 140 and a secure element domain 150 with at least one interface (in particular, a secure element in the secure element domain 150 comprises one or more interfaces). The contact-less communication domain 140 and the secure element domain 150 are hereby integrated onto the same chip 130 and are connected via a domain interface 190. The contact-less communication domain 140 comprises an NFC controller and an NFC (antenna) interface 142 connected to an NFC antenna 143. The contact-less communication domain 140 further comprises an NFC interface 142 and a communication external interface 145 to an application control device 110 of the electronic device 100. The application control device 110 comprises a host domain (SE external domain) 120 that can be connected to the contact-less communication domain 140 via the communication external interface 145 and/or to the security element domain 150 via a (secure) external interface 158. The secure element domain 150 comprises a physical memory region with a plurality of data sets 160, in particular secure element applications.

Figure 2:
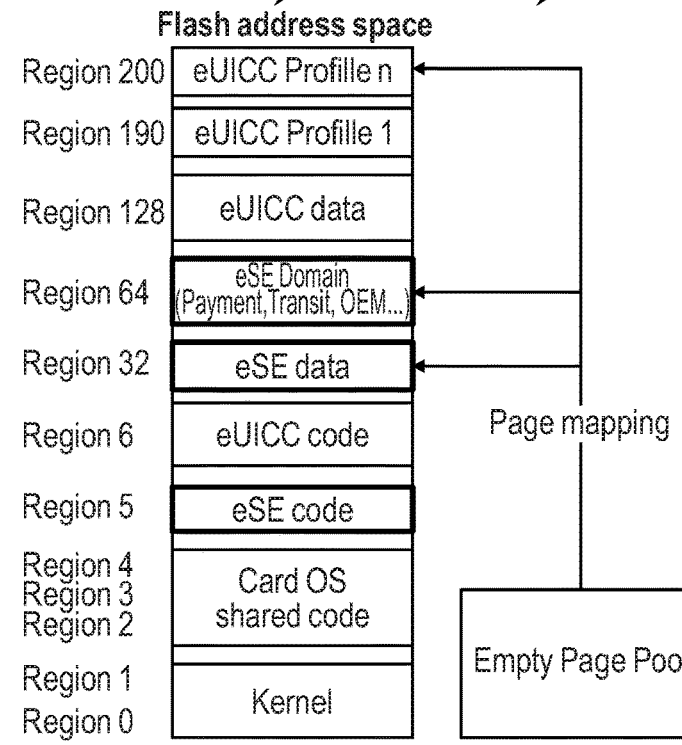
FIG. 2 illustrates an exemplary embodiment of the memory of the secure element domain according to an exemplary embodiment of the disclosure.

FIG. 2 illustrates an exemplary embodiment of the organization of the memory of the secure element domain 150 according to an exemplary embodiment of the disclosure. The physical memory region 152 is split into flash pages of for example 512 bytes. These pages can be mapped (transferred) as needed from empty page pool of the physical memory region 152 into virtual regions of the virtual memory region 154. The secure element domain 150 comprises a number of virtual regions, and each region can have for example 512 kilobytes of virtual space. These regions can be distributed within the logical address space, for example a 2.5 megabyte physical memory region can be mapped to a 128 megabyte virtual memory region. Large virtual region allows clustering of related memory in virtual contiguous space without the concern of physical memory region fragmentation, dynamic growth etc. Such a virtual mapping (transfer to virtual memory region) mechanism can provide a basis for applying the efficient utilization method proposed to maximize the possible logical address space.

Figure 3:
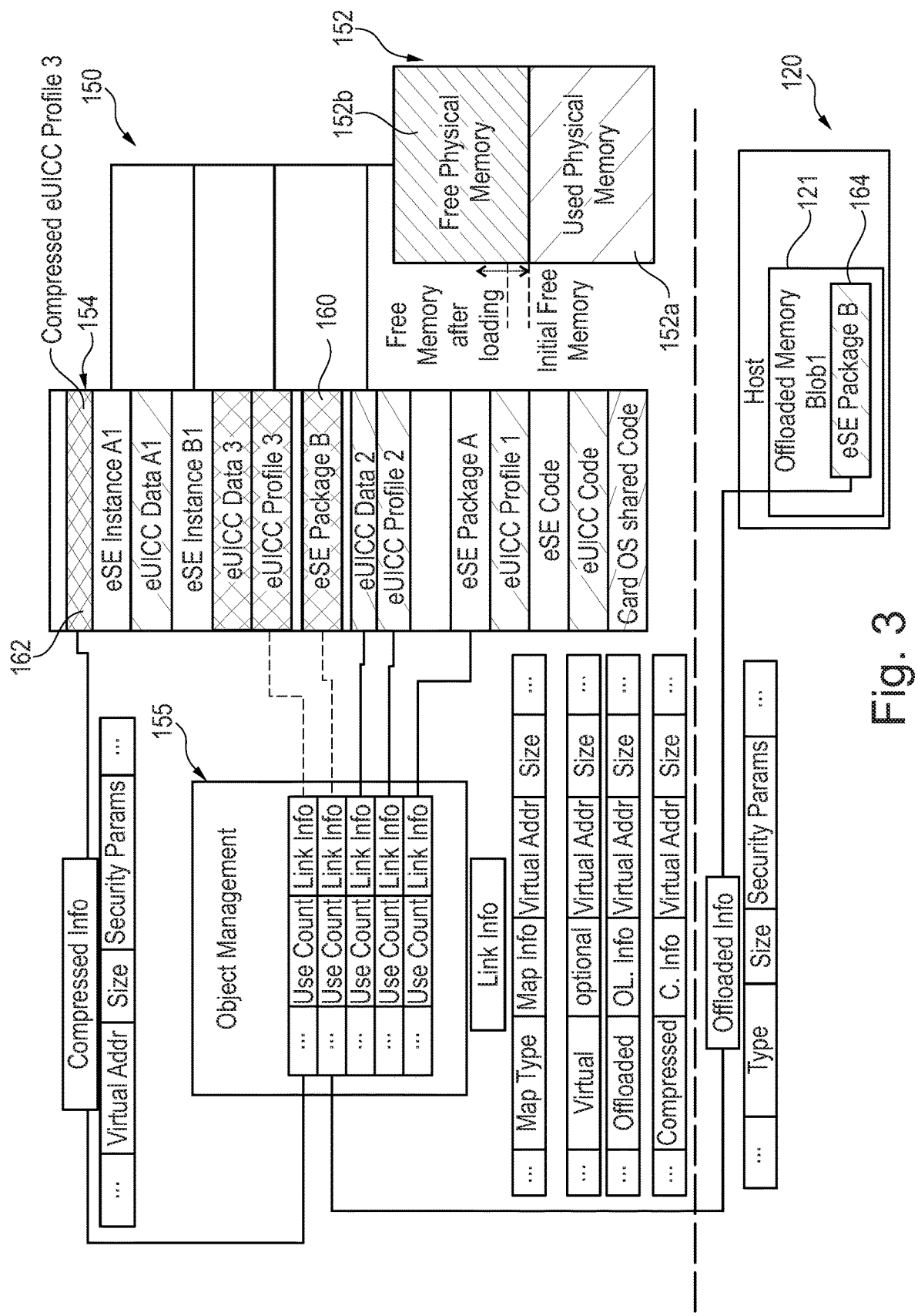
FIG. 3 illustrates an exemplary embodiment of transferring a data set as a data blob in the context of the secure element domain according to an exemplary embodiment of the disclosure.

FIG. 3 illustrates an exemplary embodiment of transferring a data set 160 as a data blob 162, 164 in the context of the secure element domain 150 according to an exemplary embodiment of the disclosure. As an example, the "eSE Package B" is used as the data set 160 to be transferred. To release the used physical memory region 152a, the data set 160 is transferred away, thereby leaving free physical memory region space 152b. An object manager 155 of the secure element domain 150 is configured to up-date and store the position of each transferred data set 160. For example, the object manager 155 can indicate based on meta/link-data if a specific data set 160 is off-loaded or transferred to virtual memory region, compressed and/or secured.

Transferring the data set 160 comprises in one example transferring the data set 160 as a first data blob 162 to the virtual memory region 154 of the secure element domain 150. Hereby, data set 160 is compressed to form a compressed first data blob 162 that is transferred to the virtual memory region 154, while the object manager 155 is up-dated to store this transfer.

Transferring the data set 160 comprises in another example off-loading the data set 160 (from the secure element domain 150) as a second data blob 164 to an exterior domain 120, in particular a host domain. The data set 160 is optionally secured by encryption and is then transferred to the external domain 120, while the object manager 155 is up-dated to store this transfer.

In a detailed example, the following steps are performed. In addition to virtual to physically mapping, a new object management mechanism (structure and flow) is defined, wherein the object management structure stores three types of mappings:
  i) object is mapped to physical memory region,
  ii) object is off-loaded as self-secure data blob to an off-card memory (for off-loaded type additional off-loaded info like size, security parameters (identifier, encryption type, keys, etc.) are stored),
  iii) object is compressed and mapped to virtual memory region holding compressed data blob (for compressed type additional compression info like compressed virtual address, size, security params (identifier, encryption type, keys, etc.) is stored).

The object management structure also stores info (ex. usage count/frequency) which is used as criteria for triggering one of the physical memory region utilization improvement process. Additional meta data may describe compressed and uncompressed sizes.

Figure 4:
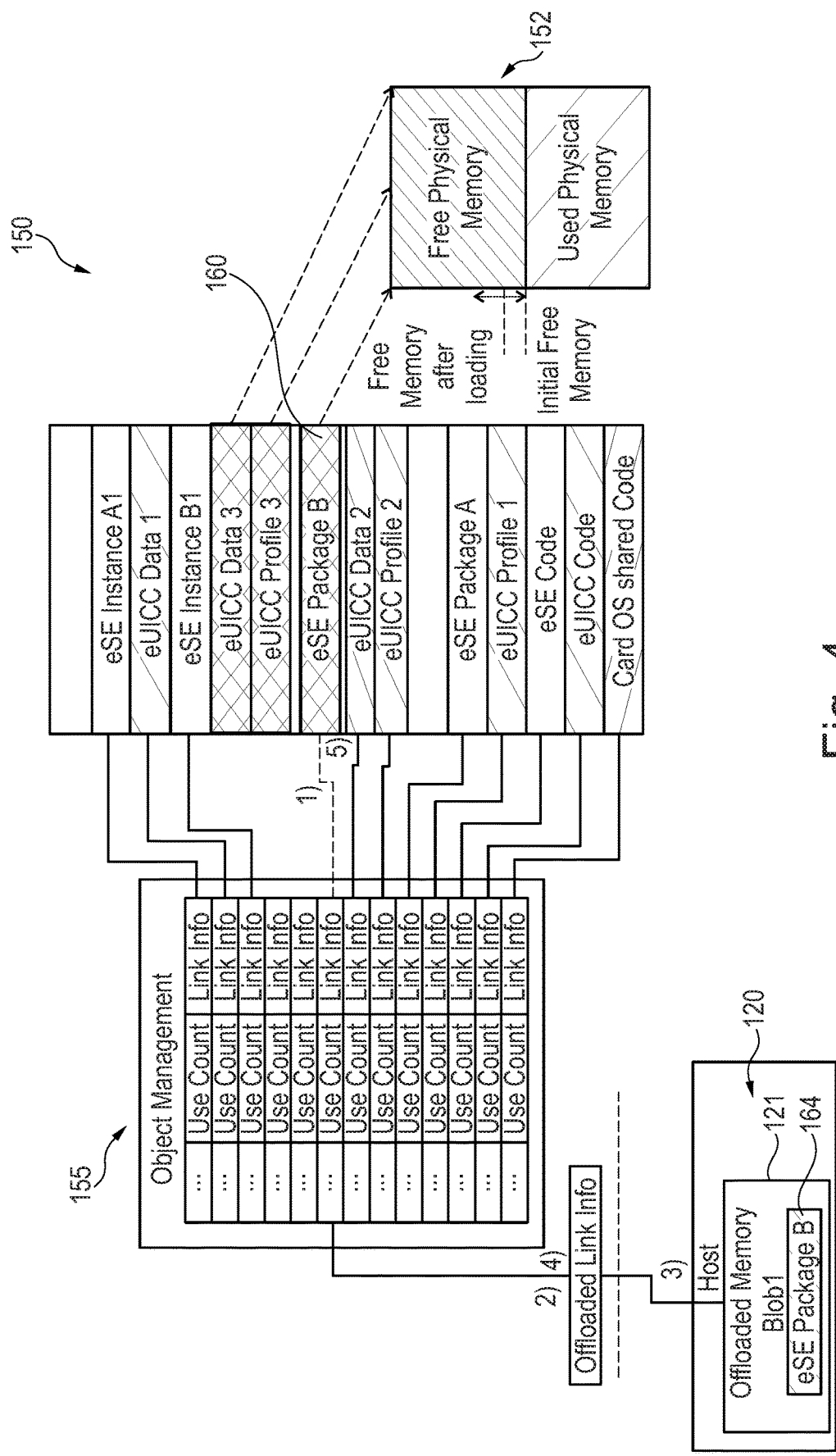
FIG. 4 illustrates an exemplary embodiment of off-loading and re-loading the second data blob between physical memory region and external memory according to an exemplary embodiment of the disclosure.

FIG. 4 illustrates an exemplary embodiment of off-loading and re-loading a data blob 164 between the physical memory region 152 and the external memory 121 of the external domain 120 according to an exemplary embodiment of the disclosure.

In a detailed example, the following steps can be performed during (secure) off-loading: certain objects could be marked for initial offloading, during production after the installation of application in the security hierarchy, the corresponding objects are marked as off-loaded, the physical mapped memory is released, and the secure off-load data blob is provided to be stored on host.

In a further detailed example, the following steps can be performed during (secure) off-loading: the card OS periodically checks for available free memory, when reaching pre-defined threshold, the card OS analyzes through object mapping criteria for off-loading (e.g. the usage count), identifies objects for off-loading, creates a secure off-load data blob, the corresponding objects are marked as off-loaded, and the secure offload blob is off-loaded to host and physical mapped memory is released.

In a further detailed example, the following steps can be performed during (secure) re-loading: the object management identifies access to object data that is off-loaded, the object management checks the physical memory region availability to re-load the data blob, the object management sends request to host to fetch the off-loaded secure data blob, the object management receives the off-loaded secure data blob, the object management verifies integrity (the data blob is self-secure, no secure channel required from host), the object management allocates physical memory region against required virtual memory region for the data blob, and the object management loads content to physical memory region and updates the object mapping.

Figure 5:
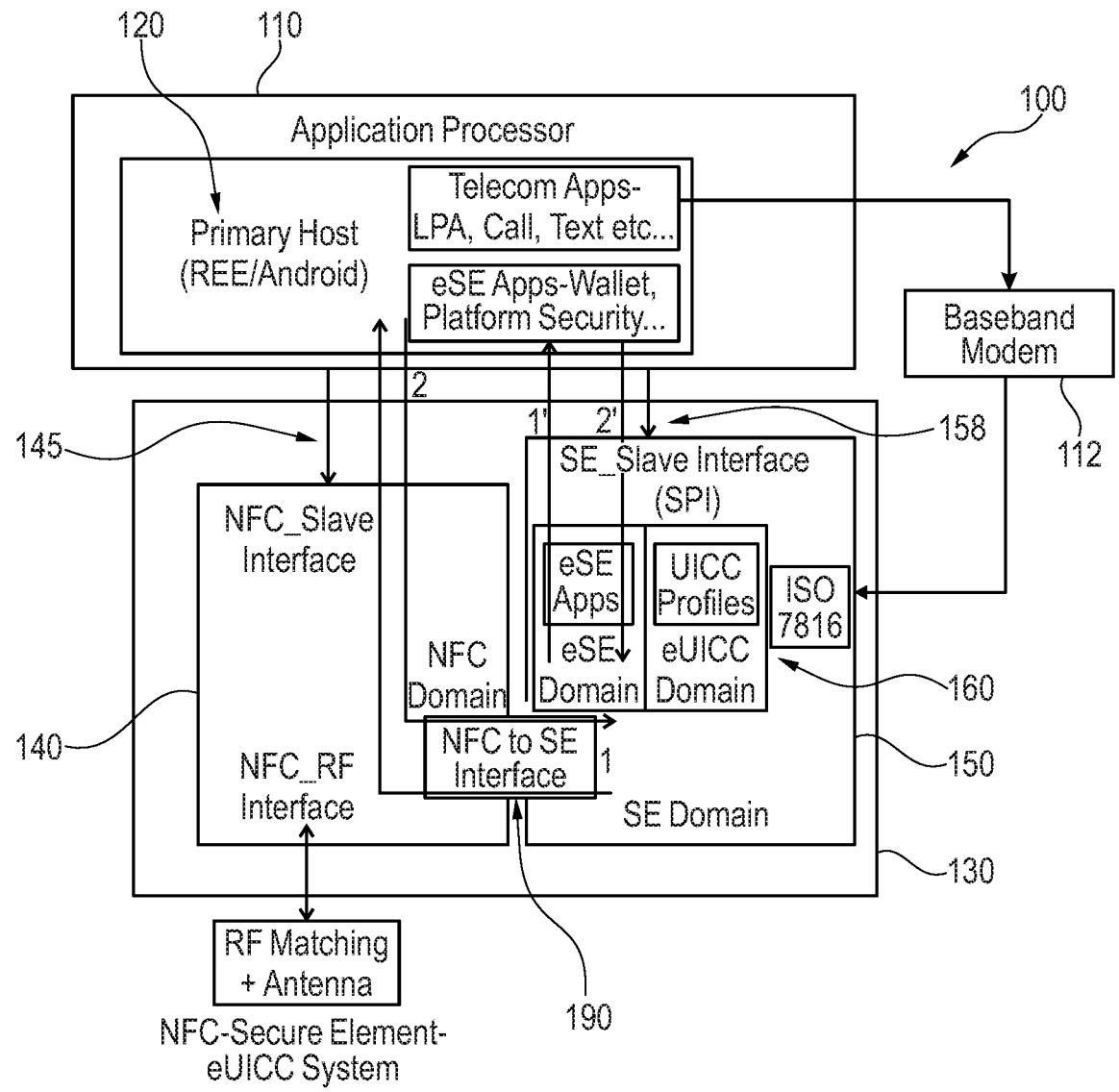
FIG. 5 illustrates an exemplary embodiment of off-loading and re-loading the second data blob via a contact-less communication domain according to an exemplary embodiment of the disclosure.

FIG. 5 illustrates an exemplary embodiment of off-loading and reloading the data blob 164 via a contact-less communication domain 140 according to an exemplary embodiment of the disclosure. In a first example, the data blob 164 is off-loaded the secure element domain 150 and the external domain 120 through the secure external domain 158. In a further, example a notification is send through the secure external domain 158 (direct SE interface) that an off-loading through the contact-less communication domain 140 will be performed.

In a second example, off-loading the data blob 164 is done from the secure element domain 150 via the domain interface 190 to the contact-less communication domain 140 and further via a communication-external interface 145 to the external domain 120. In the same manner, reloading the data blob 164 is done from the external domain 120 via the communication-external interface 145 to the contact-less communication domain 140 and via the domain interface 190 to the secure element domain 150.

Figure 6:
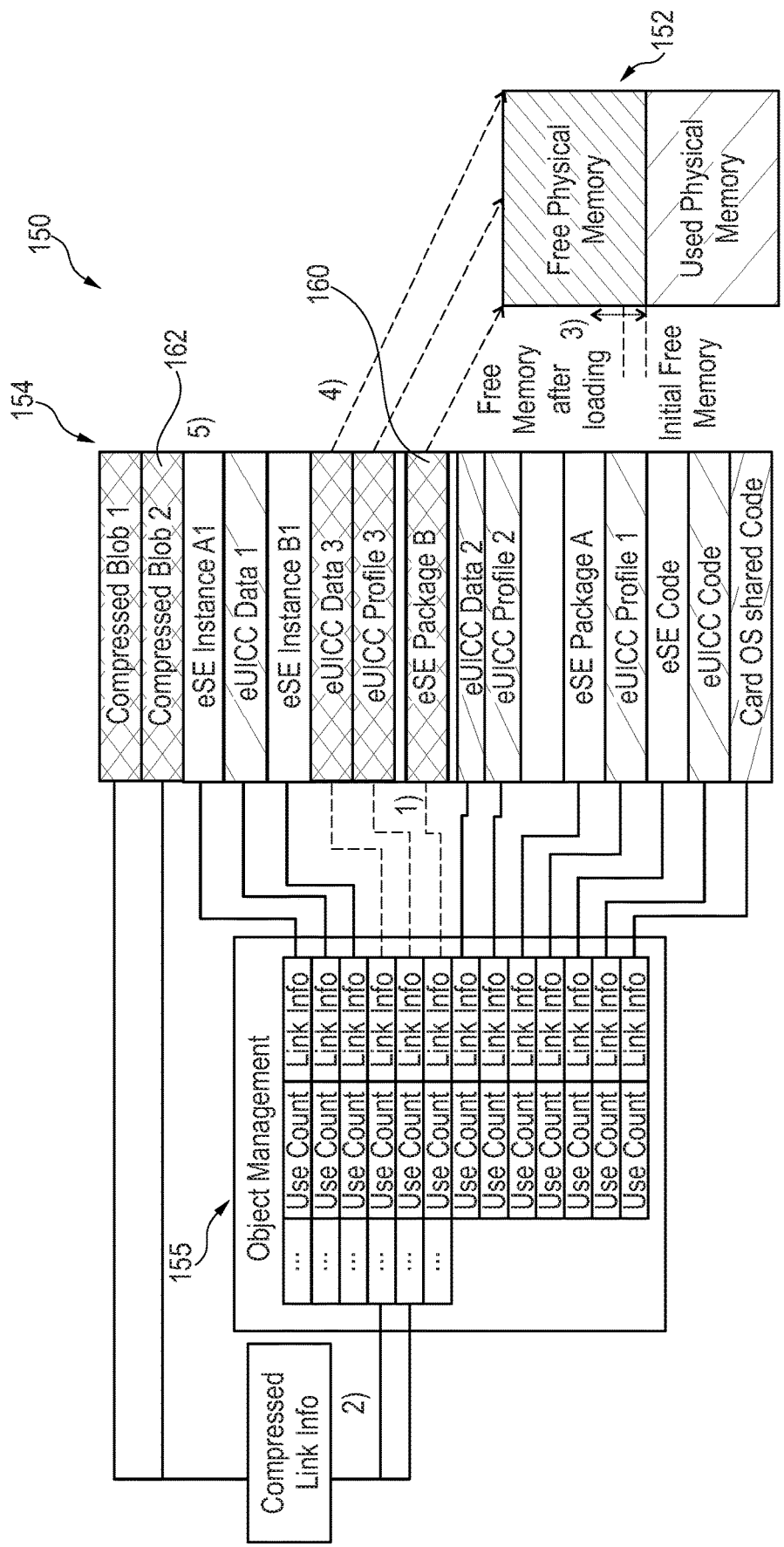
FIG. 6 illustrates an exemplary embodiment of transferring and re-transferring the first data blob with respect to the virtual memory region according to an exemplary embodiment of the disclosure.

FIG. 6 illustrates an exemplary embodiment of transferring and re-transferring the first data blob 162 between physical memory region 152 and virtual memory region 154 according to an exemplary embodiment of the disclosure. Hereby, the data set 160 is compressed to obtain a compressed first data blob 162.

In a detailed example, compression and transfer comprises the following steps: certain objects could be marked for initial compression, during production after the installation of application in the security hierarchy, the corresponding objects are marked as compressed, the compressed data blob is stored on card and the compressed link info is updated, and the physical mapped memory is then released.

In a further detailed example, compression and transfer comprises the following steps: the card OS is updated periodically for condition to initiate compression, e.g. an eUICC profile is deactivated or more than 'n' profiles installed (e.g >3), objects are identified for compressing, thereby creating a compressed data blob, which is stored on card and the compressed link info is up-dated, the corresponding objects are marked as compressed, and the physical mapped memory is released.

In a further detailed example, de-compression and re-transfer comprises the following steps: the object management identifies the data blob (e.g. profile such as eUICC profile or package) requested for activation is compressed, the object management checks physical memory region availability to de-compress the profile, the object management may decide to compress other profile/data first to gain necessary free memory, the object management allocates physical memory region against required virtual memory region for the de-compressed profile, the object management de-compresses the secure data blob to physical memory region, up-dates the virtual memory region mapping, and the compressed block memory is released.

In this specification, example embodiments have been presented in terms of a selected set of details. However, a person of ordinary skill in the art would understand that many other example embodiments may be practiced which include a different selected set of these details. It is intended that the following claims cover all possible example embodiments.

REFERENCE NUMERALS

100 Electronic device
110 Application processor
120 External domain, host domain
121 Further memory
130 Integrated circuit
140 Contact-less communication domain
142 NFC interface
143 NFC antenna
145 Communication interface
150 Secure element domain
152 Physical memory region
152a Used physical memory region
152b Free physical memory region
154 Virtual memory region
155 Control device, object manager
158 External interface 160 Data set
162 First blob
164 Second blob
190 Domain interface

The invention claimed is:

1. An electronic device, comprising a secure element domain that further comprises:
   a physical memory region configured to store a plurality of data sets; and
   a control device, coupled to the physical memory region, and configured to: transfer at least one data set of the plurality of data sets away from the physical memory region, wherein transferring the data set comprises
   compressing a first data set to obtain a compressed first data blob and transferring the compressed first data blob to a virtual memory region of the secure element domain.

2. The electronic device according to claim 1, wherein the control device comprises an object manager.

3. The electronic device according to claim 2, wherein the object manager is configured to register the position of the compressed first data blob in the virtual memory region.

4. The electronic device according to claim 2, further comprising off-loading a second data set as a second data blob to an external domain, wherein the object manager is configured to register the position of the second data blob in the external domain.

5. The electronic device according to claim 1, wherein a security hierarchy of the security domain is independent of the transferring.

6. The electronic device according to claim 1, wherein the at least one data set comprises at least one of a secure element application, a profile, or a plurality of pages.

7. The electronic device according to claim 1, wherein the control device is further configured to de-compress only a part of the compressed first data blob, wherein the part is smaller than the first data blob.

8. The electronic device according to claim 1, wherein the control device is further configured to allocate the physical memory region against required virtual memory region for the compressed first data blob.

9. The electronic device according to claim 4, wherein the control device is further configured to reload the off-loaded second data blob from the external domain.

10. The electronic device according to claim 9 wherein reloading is via an external interface and free of an additional secure channel.

11. The electronic device according to claim 4, wherein the external domain is configured to store the off-loaded second data blob in a further physical memory region.

12. The electronic device according to claim 11, wherein the external domain comprises at least one of a host domain and an application control device.

13. An electronic device, comprising a secure element domain that further comprises:
   a physical memory region configured to store a plurality of data sets; and
   a control device, coupled to the physical memory region, and configured to: transfer at least one data set of the plurality of data sets away from the physical memory region, wherein transferring the data set comprises at least one of:
   transferring the data set as a first data blob to a virtual memory region of the secure element domain and
   off-loading the data set as a second data blob to an external domain wherein the electronic device further comprises a contact-less communication domain coupled to the secure element domain via a domain interface, and wherein the control device is further configured to off-load the second data blob from the secure element domain via the domain interface to the contact-less communication domain and via a communication-external interface to the external domain.

14. The electronic device according to claim 13, wherein the control device is further configured to reload the second data blob from the external domain via the communication-external interface to the contact-less communication domain and via the domain interface to the secure element domain.

15. The electronic device according to claim 13, wherein the contact-less communication domain and the secure element domain are integrated into a common integrated circuit.

16. A mobile device comprising the electronic device according to claim 1, wherein the mobile device is one of a smart card and a mobile phone.

17. A method of managing a secure element domain that comprises a physical memory region with a plurality of data sets, the method comprising:
   analyzing the data sets stored in the physical memory region with respect to a data transfer criterium, and, in case that the data transfer criterion is fulfilled for a data set of the plurality of data sets; and
   transferring said data set away from the physical memory region, wherein transferring the data set comprises
   compressing the data set to obtain a compressed data blob and transferring the compressed data blob to a virtual memory region of the secure element domain.

* * * * *